(12) United States Patent
Peters et al.

(10) Patent No.: US 9,375,020 B2
(45) Date of Patent: Jun. 28, 2016

(54) DEVICE FOR SEPARATING A LEG PART FROM A CARCASS PART OF SLAUGHTERED POULTRY

(71) Applicant: MAREL STORK POULTRY PROCESSING B.V., Boxmeer (NL)

(72) Inventors: Erik Hendrikus Werner Peters, Boxmeer (NL); Petrus Christianus Hendrikus Janssen, Wilbertoord (NL); Roger Pierre Hubertus Maria Claessens, Nijmegen (NL)

(73) Assignee: Marel Stork Poultry Processing B.V. (NL)

( * ) Notice: Subject to any disclaimer, the term of this patent is extended or adjusted under 35 U.S.C. 154(b) by 58 days.

(21) Appl. No.: 14/436,586

(22) PCT Filed: Oct. 9, 2013

(86) PCT No.: PCT/NL2013/050714
§ 371 (c)(1),
(2) Date: Apr. 17, 2015

(87) PCT Pub. No.: WO2014/062054
PCT Pub. Date: Apr. 24, 2014

(65) Prior Publication Data
US 2015/0282496 A1 Oct. 8, 2015

(30) Foreign Application Priority Data

Oct. 17, 2012 (NL) .................................. 2009647

(51) Int. Cl.
*A22C 21/00* (2006.01)

(52) U.S. Cl.
CPC ................... *A22C 21/0023* (2013.01)

(58) Field of Classification Search
USPC ................ 452/149–155, 166, 167
See application file for complete search history.

(56) References Cited

U.S. PATENT DOCUMENTS 4,639,973 A * 2/1987 van der Eerden ...... A22C 21/00
452/167

4,935,990 A 6/1990 Linnenbank
(Continued)

FOREIGN PATENT DOCUMENTS

EP 0459580 A1 12/1991
WO 2014062053 A1 4/2014

OTHER PUBLICATIONS

International Patent Application No. PCT/NL2013/050713, International Preliminary Report on Patentability, issued Apr. 21, 2015, 6 pages.

(Continued)

*Primary Examiner* — Richard Price, Jr.
(74) *Attorney, Agent, or Firm* — Kilpatrick Townsend & Stockton LLP

(57) ABSTRACT

The invention pertains to a device for separating at least one leg part (1) from a carcass part of slaughtered poultry, wherein the device comprises: —a main conveyor, which main conveyor comprises a plurality of carriers (10), each carrier being adapted to engage a carcass parts by or in the vicinity of the free ends of the leg parts, the main conveyor being provided with a drive for moving the carriers along a path, —a hip dislocator assembly, which is adapted to dislocate the hip joints in such a way that after said dislocation, a tissue connection remains between each leg part and the saddle, and adapted to disengage the leg parts from the carrier of the main conveyor, —a saddle support guide (32), which is adapted for supporting the saddle of the carcass part after the carcass part has become disengaged from the carrier of the main conveyor, —a leg separator (40) comprising two leg grippers (41), each leg gripper comprising a leg gripping slot that is adapted for engaging a leg part, wherein the leg grippers are adapted to induce a downward pulling movement of the leg parts relative to the saddle, thereby tearing loose the tissue connection between each leg part and the saddle such that the leg parts are separated from the saddle.

34 Claims, 11 Drawing Sheets

(56) References Cited

U.S. PATENT DOCUMENTS

| | | | |
|---|---|---|---|
| 5,035,673 A | | 7/1991 | Hazenbroek |
| 5,045,022 A | | 9/1991 | Hazenbroek |
| 5,176,563 A | * | 1/1993 | van den Nieuwelaar ........ A22C 21/0023 452/166 |
| 5,188,559 A | * | 2/1993 | Hazenbroek ....... A22C 21/0023 452/167 |
| 5,194,035 A | * | 3/1993 | Dillard ................... A22C 21/00 452/149 |
| 5,312,291 A | | 5/1994 | van den Nieuwelaar et al. |
| 5,336,127 A | | 8/1994 | Hazenbroek |
| 5,407,383 A | | 4/1995 | Diesing et al. |
| 5,429,549 A | | 7/1995 | Verrijp et al. |
| 5,713,787 A | * | 2/1998 | Schoenmakers ..... A22C 17/004 452/136 |
| 6,004,199 A | | 12/1999 | Habenicht et al. |
| 6,312,326 B1 | * | 11/2001 | van den Nieuwelaar .......... A22B 5/0094 452/120 |
| 6,322,438 B1 | | 11/2001 | Barendregt et al. |
| 7,059,954 B2 | * | 6/2006 | Annema ............ A22C 21/0092 452/135 |
| 7,115,030 B2 | * | 10/2006 | van Hillo ........... A22C 21/0023 452/167 |
| 8,308,535 B2 | | 11/2012 | De Vos et al. |
| 8,491,362 B2 | * | 7/2013 | Kodama ............. A22C 21/0076 452/136 |
| 8,834,237 B2 | | 9/2014 | Van Hillo et al. |
| 2005/0059334 A1 | | 3/2005 | Haley et al. |

OTHER PUBLICATIONS

International Patent Application No. PCT/NL2013/050713, International Search Report and Written Opinion, mailed Jan. 1, 2014, 9 pages.

International Patent Application No. PCT/NL2013/050714, International Preliminary Report on Patentability, issued Apr. 21, 2015, 6 pages.

Netherlands Patent Application No. 2009646, Search Report dated Jul. 8, 2013 and English version of Written Opinion, 8 pages.

International Patent Application No. PCT/NL2013/050714, International Search Report and Written Opinion, mailed Jan. 16, 2014, 9 pages.

Netherlands Patent Application No. 2009647, Search Report dated Jul. 8, 2013 and English version of Written Opinion, 8 pages.

U.S. Appl. No. 14/436,560, Notice of Allowance, mailed Oct. 6, 2015, 10 pages.

U.S. Appl. No. 14/796,211, Non-Final Office Action, mailed Sep. 24, 2015, 7 pages.

* cited by examiner

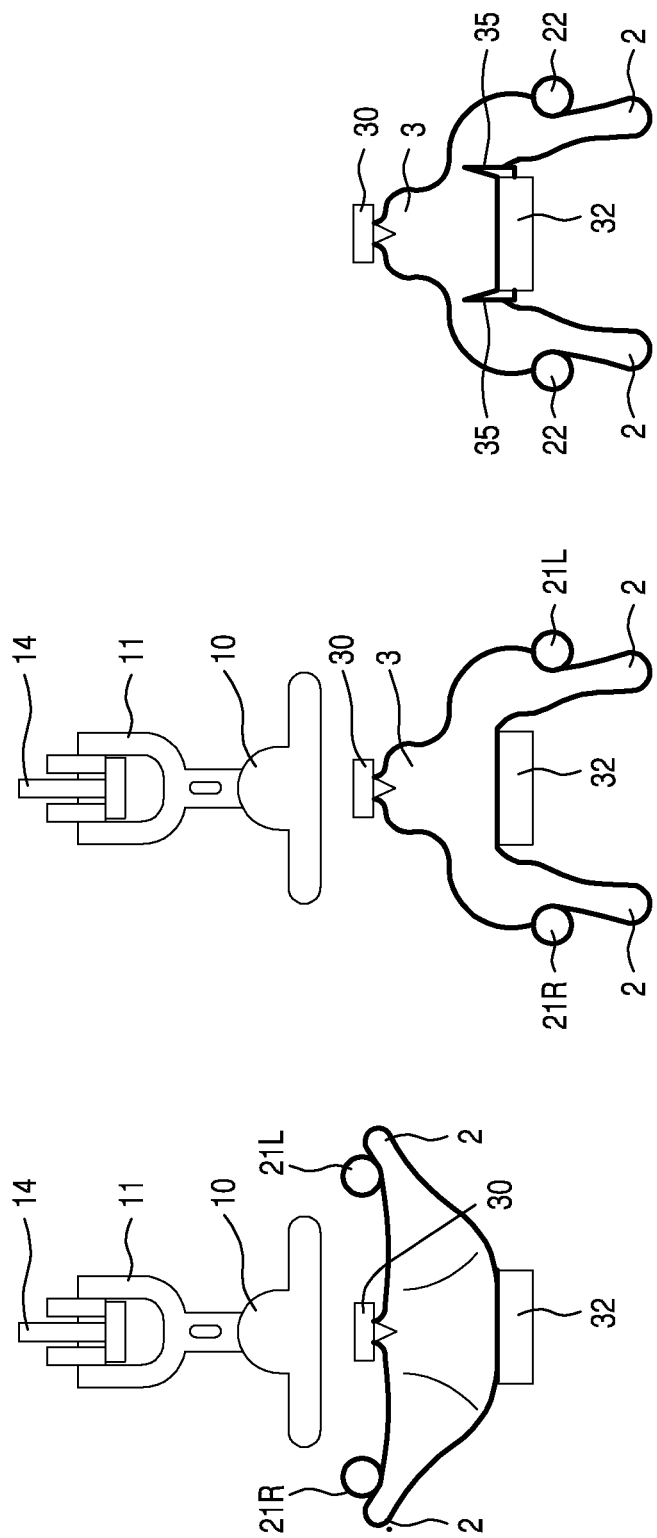

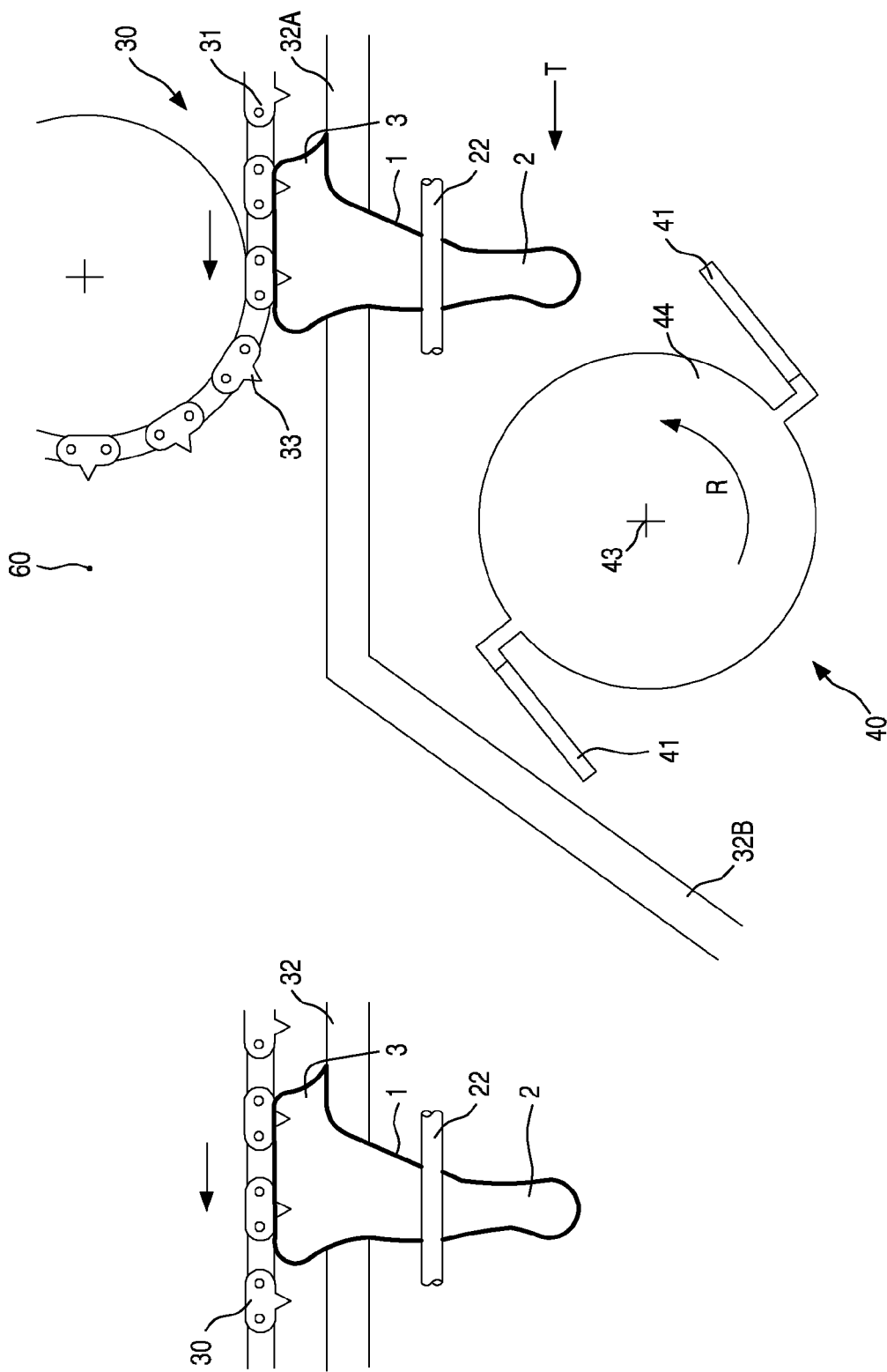

DEVICE FOR SEPARATING A LEG PART FROM A CARCASS PART OF SLAUGHTERED POULTRY

CROSS-REFERENCE TO RELATED APPLICATIONS

This patent application is the U.S. national phase of International Application No. PCT/NL2013/050714, filed on Oct. 9, 2013 and published in English on Apr. 24, 2014 as International Publication No. WO 2014/062054 A1, which application claims priority to Netherlands Patent Application No. 2009647, filed on Oct. 17, 2012, the contents of all of which are incorporated herein by reference.

FIELD

The invention pertains to a device and method for separating a leg part from a carcass part of slaughtered poultry.

BACKGROUND

The carcass part comprises leg parts that comprise at least a part of the thigh, the carcass part further comprising a saddle that is connected to each of the thighs via the hips, each leg part comprising a free end on the side opposite to the side where it is connected to the saddle. An example of such a carcass part is a back half.

The invention is suitable for anatomic separation of a leg part from a carcass part of slaughtered poultry. This means that the cut or cuts that are made to separate the leg part from the carcass parts do not go through the bones of hip joint. Usually, the hip joints are dislocated in this process to gain better access to tendons and similar tissue that need to be cut through in the separation process.

EPO459580 describes such a device and method. In the device and method of EPO459580, carcass parts such a back halves are brought to the device by an overhead conveyor that is provided with carriers. Each back half is suspended from a carrier; the carrier engages the back halves in the vicinity of the free ends of the leg parts.

When the back half has entered the device of EPO459580, a groin cut is made in the groin area between each leg part and the saddle. Then, a hip dislocating guide pushes the legs apart from each other. Due thereto, the leg parts become disengaged from the carrier of the overhead conveyor. The hip dislocating guide keeps on pushing the legs apart, to such an extent that the hip joints become dislocated and the leg parts come to hang down from the saddle instead of pointing upward, upward being their natural position.

A conveyor is provided in the device of EPO459580 that provides transport of the back halves when they are no longer carried by the carrier of the overhead conveyor. This conveyor engages the saddle.

After dislocation of the hip joints, an incision is made between each leg part and the saddle in the back region of the carcass part using a back cutter in such a way that after making the back incision, a tissue connection remains between the each leg part and the saddle part. The leg parts are therefore still connected to the saddle.

The back half is then conveyed further within the device by a spiked chain that engages the saddle. The back half is supported by a support guide during this movement.

Then, each leg part is gripped by a leg gripper. The leg gripper has a leg gripping slot for engaging a leg part and is moveable along a track that extends horizontally and parallel to the path followed by the saddle. Multiple leg grippers are mounted on an endless chain, of which the top flight runs parallel to the support guide for the saddle.

The leg grippers move at a higher velocity than the velocity at which the saddles are conveyed. So, when a leg gripper engages a leg part, the leg is moved faster than the saddles. This produces a pulling action that separates the leg parts from the saddle.

According to the disclosure of EPO459580, the direction in which the leg parts are pulled off the saddle is essential for harvesting the oyster meat together with the leg parts in a reliable way.

In general, the device and method of EPO459580 functions in a satisfactory way. However, the device is complex and therefore expensive. It also takes up quite some floor space.

SUMMARY

It is the object of the invention to provide an alternative and preferably improved device and method for separating leg arts from a carcass part of slaughtered poultry.

The invention comprises a device for separating at least one leg part from a carcass part of slaughtered poultry. This carcass part comprises leg parts that comprise at least a part of the thigh. The carcass part further comprises a saddle that is connected to each of the thighs via the hip. Each leg part has a free end on the side opposite to the side where it is connected to the saddle.

The device according to the invention comprises:
a main conveyor, which main conveyor comprises a plurality of carriers, each carrier being adapted to engage a carcass parts by or in the vicinity of the free ends of the leg parts in such a way that the carcass part is suspended from the carrier with the free ends of the leg parts pointing upward,
the main conveyor being provided with a drive for moving the carriers along a path,
a hip dislocator assembly, which is adapted to dislocate the hip joints in such a way that after said dislocation, a tissue connection remains between each leg part and the saddle, and adapted to disengage the leg parts from the carrier of the main conveyor such that the free ends of the leg parts come to point downward,
a saddle support guide, which is adapted for supporting the saddle of the carcass part after the carcass part has become disengaged from the carrier of the main conveyor,
a leg separator comprising two leg grippers, each leg gripper comprising a leg gripping slot that is adapted for engaging a leg part,
wherein the leg grippers are adapted to induce a downward pulling movement of the leg parts relative to the saddle, thereby tearing loose the tissue connection between each leg part and the saddle such that the leg parts are separated from the saddle,
the leg separator being arranged relative to the saddle support guide such that the saddle support guide supports the saddle during the gripping and pulling of the leg parts.

The invention also comprises a method for separating at least one leg part from a carcass part of slaughtered poultry. This carcass part comprises leg parts that comprise at least a part of the thigh. The carcass part further comprises a saddle that is connected to each of the thighs via the hip. Each leg part has a free end on the side opposite to the side where it is connected to the saddle.

The method according to the invention comprises the following steps:
- conveying the carcass parts along a path in a main conveyor, which main conveyor comprises a plurality of carriers, a carrier engaging a carcass parts by the free ends of the leg parts in such a way that the carcass part is suspended from the carrier with the free ends of the leg parts pointing upward,
- dislocating the hip joints such that a tissue connection remains between each leg part and the saddle,
- disengaging the leg parts from the carrier of the main conveyor, thereby making the free ends of the leg parts point downward,
- after disengaging the leg parts from the carrier of the main conveyor, supporting the saddle,
- gripping each leg part using a leg separator with a leg gripper, each leg gripper having a leg gripping slot for engaging a leg part,
- separating the leg parts from the saddle by exerting a downward pulling movement on the leg parts relative to the saddle, thereby tearing loose the tissue connection between each leg part and the saddle such that the leg parts become separated from the saddle.

Optionally, in the method according to the invention, after the leg parts have become disengaged from the carrier of the main conveyor, the carcass part is supported by a saddle support guide, and wherein said saddle support guide supports the saddle when the leg parts are gripped by the leg grippers of the leg separator and are subjected by the downward pulling movement.

In the device and method according to the invention, the leg parts are separated from the saddle by pulling the leg parts downward relative to the saddle. This allows for a simpler construction and reduces the length of the device. Experiments have shown that with the device and method according to the invention, the oyster meat is still reliably harvested together with the leg parts. By pulling the legs downward, the device can be of smaller and simpler construction.

The downward pulling can be achieved by holding the saddle in a fixed position and at the same time exerting a pulling force on the leg parts by means of the leg grippers of the leg separator. However, it is also an option that the saddles are moved during the pulling of the leg parts. Such movement can be achieved by a second saddle conveyor that conveys the saddles along a second saddle conveying path.

In a possible embodiment of the device and method according to the invention, a relative movement of the leg gripper and the second saddle conveyor induces a downward pulling movement of the leg parts relative to the saddle. This pulling movement tears loose the remaining connection between the saddle and the leg parts with the result that the leg parts become separated from the saddle.

So, optionally, the device according to the invention further a second saddle conveyor, which second saddle conveyor is adapted to engage the carcass part by the saddle and to convey the saddle of the carcass part along a second saddle conveying path, wherein the leg grippers and the second saddle conveyor together are adapted to induce the downward pulling movement of the leg parts relative to the saddle. And optionally, the method according to the invention comprises a step wherein a second saddle conveyor conveys the saddle along a second saddle conveying path and wherein the leg grippers and the second conveyor together induce the downward pulling movement on the leg parts relative to the saddle.

The pulling can be due to a difference between the speed at which the saddle is conveyed by the second saddle conveyor and the speed at which each leg part is moved by the associated leg gripper. The pulling can, alternatively or in addition, be due to the diverging of the path that the saddle is made to follow by the second saddle conveyor and the saddle support guide on the one hand and the path that the leg part is made to follow by the leg gripper on the other.

It is possible that during pulling, the second saddle conveyor or a holder element holds the saddle stationary and the leg grippers move the leg parts downward. Alternatively, it is possible that during pulling, the leg grippers hold the leg parts stationary and the second saddle conveyor move the saddle upward. Alternatively, both the leg parts and the saddle are moved.

In general, the second saddle conveyor will move the saddle and the leg grippers will move the leg parts during the pulling. The relative movement will be such that the leg parts are pulled downward relative to the saddle. This can be achieved by moving the saddle upward and at the same time moving the leg parts downward, but it is also possible that both the saddle and the leg parts are moved downward or that both the saddle and the leg parts are moved upward. In the latter two cases, the relative movement can for example be caused by a different speed of movement or a different angle of inclination of the movement of the second saddle conveyor and the leg grippers.

The direction in which the pulling occurs is substantially opposite to the direction in which the leg parts naturally extend relative to the saddle, or at least at an angle relative to that natural direction. This helps to reliably harvest the oyster meat with the leg parts.

In order to obtain an anatomical separation of the leg parts from the saddle, the device according to the invention comprises a hip dislocator assembly. In the hip dislocator assembly, the hip joints are dislocated, which makes it possible to reach tendons or other tissue by a cutter or the like without damaging the bones of the carcass part. In the hip dislocator assembly, the leg parts are brought into such a position relative to the saddle that the leg parts point in a direction that is at least substantially opposite to their natural position.

Initially, the carcass parts are arranged in carriers of a main conveyor. The carriers engage the carcass parts at or near the free ends of the leg parts. The carcass parts are suspended from the carriers, so the saddle is below the free ends of the leg parts. The leg parts, as seen in the direction from the hip joint to the free end, point upward. This relative position of the saddle and the leg parts is indicated as the "natural position", as this is the relative position the leg parts and the saddle have to each other when the natural connections between the leg parts and the saddle are all still intact.

After the dislocation of the hip joints, the connection between the saddle and the leg parts is far more flexible than with the hip joints in their natural position. If the saddle is held in the same position as it assumed when the carcass part was in the carrier of the main conveyor and the leg parts are disengaged from the carrier, the leg parts under the influence of gravity assume a position with their free ends pointing downward.

In a possible embodiment, the hip dislocator assembly comprises a hip dislocating guide, which hip dislocating guide is arranged below the main conveyor such that it engages carcass parts between the legs. The hip dislocating guide gradually extends outward and downward such that the leg parts are spread apart, thereby disengaging the leg parts from the carrier of the main conveyor and dislocating the hip joints such that the free ends of the leg parts come to point downward. In this position, the direction of the leg parts relative to the saddle is at least substantially opposite to their natural position.

In a possible embodiment of the method according to the invention, in the step of dislocating the hip joints a hip dislocating guide is arranged below the main conveyor and between the leg parts, said hip dislocating guide gradually extending outwardly and downwardly, the carcass part being moved relative to this hip dislocating guide such that the leg parts become disengaged from the carrier of the main conveyor and the hip joints become dislocated, and wherein after the dislocation of the hip joints, the free ends of the leg parts are pointing downward.

Alternatively, it is known to dislocate the hip joints by keeping the leg parts engaged in the carrier and at the same time rotating the saddle about an axis of rotation that is perpendicular to the path of the main conveyor at this point. If in this method of dislocation, the saddle is rotated over about 180°, and then the leg parts are disengaged from the carrier of the main conveyor such that they come to point downward, the leg parts are more or less in their natural position relative to the saddle again. If the leg parts are then pulled downward, they will still become neatly separated from the saddle, but the oyster is less reliably harvested with the leg part.

Optionally, the device further comprises a first saddle conveyor, which first saddle conveyor is arranged below the carriers of the main conveyor and upstream of the second saddle conveyor if such a second saddle conveyor is present. The first saddle conveyor is arranged and adapted to engage the saddle of the carcass part and to convey the carcass part along a first saddle conveying path at a conveying speed.

So, optionally, the method according to the invention comprises an embodiment wherein a first saddle conveyor is arranged below the carriers of the main conveyor and upstream of the second saddle conveyor if such a second saddle conveyor is present, which first saddle conveyor engages the saddle of the carcass part and conveys the carcass part along a first saddle conveying path at a conveying speed.

Optionally, if both a first saddle conveyor and a second saddle conveyor are present, the second saddle conveyor is adapted to receive the carcass part from the first saddle conveyor, preferably with the leg parts of the carcass part pointing downward. Optionally, the method according to the invention further comprises the step that the carcass part is transferred from the first saddle conveyor to the second saddle conveyor, preferably with the leg parts pointing downward.

In a possible embodiment, the first saddle conveying path and the second saddle conveying path extend under an angle relative to each other. Optionally, the second saddle conveying path extends downward relative to the first saddle conveying path. Optionally, the first saddle conveying path extends in an least substantially horizontal direction. Optionally, the second saddle conveying path extends at an angle between 15° and 60° relative to the vertical, preferably between 20° and 55° relative to the vertical, more preferably at between 30° and 50° relative to the vertical. Preferably, the second saddle conveying part slopes downward from the first saddle conveying path.

The second saddle conveying path can be straight, curved or a combination of both. In case the second saddle conveying path is entirely or partly curved, the curvature may follow a part of a circle.

The device according to the invention comprises a saddle support guide, which is adapted for supporting the saddle of the carcass part after the carcass part has become disengaged from the carrier of the main conveyor. The saddle support guide supports the saddle when each leg gripper of the leg separator grips a leg part and while the leg parts are pulled downward.

In embodiments wherein the device according to the invention comprises a first saddle conveyor and/or a second saddle conveyor, the saddle support guide optionally extends parallel to the first saddle conveyor and/or the second saddle conveyor. In a possible embodiment, the saddle support guide is at least substantially parallel to the first saddle conveying path and to the second saddle conveying path.

In a possible embodiment, the first saddle conveyor comprises a chain, which chain is optionally a chain with protrusions for engaging the saddle. Optionally, the saddle support guide is at least substantially parallel to the first saddle conveyor.

In a possible embodiment, the second saddle conveyor comprises a chain, which chain is optionally a chain with protrusions for engaging the saddle. Optionally, the saddle support guide is at least substantially parallel to the second saddle conveyor.

In a possible embodiment, the second saddle conveyor comprises a wheel, which wheel is optionally a wheel with protrusions for engaging the saddle. Optionally, the saddle support guide is at least substantially parallel to the second saddle conveyor. Optionally, the rotation axis of the wheel of the second saddle conveyor is arranged at the level of the first saddle conveying path or below it. Optionally, the direction of rotation of the wheel of the second saddle conveyor is such that the saddles are moved downward relative to the first saddle conveyor path.

In a possible embodiment, the first and/or second saddle conveyor extend above the first and/or second saddle conveying path, respectively, engaging the saddle from above, and the saddle support guide extends below the first and/or second saddle conveying path, engaging the saddle from below.

In a possible embodiment, the leg grippers are movable along a circular path in an at least substantial vertical plane. Optionally, they are adapted to engage the leg part at or near the highest point of the circular path and to effect the pulling movement during the movement towards the lowest point of the circular path.

Optionally, the method according to the invention comprises a step wherein the leg grippers are moved along a circular path in an at least substantial vertical plane, and wherein the leg grippers engage the leg part at or near the highest point of the circular path and effect the pulling movement during the movement towards the lowest point of the circular path.

Moving the leg grippers along a circular path allows a relatively simple and compact way of constructing the leg separator.

Optionally, the leg grippers are mounted such that they are rotatable about an axis of rotation. A possible way of achieving this is when at least one leg gripper is mounted on a wheel that is rotatable around said axis of rotation. Optionally, the method according to the invention comprises a step wherein the leg grippers rotate about an axis of rotation, wherein preferably at least one leg gripper is mounted on a wheel that rotates around said axis of rotation.

Optionally, the axis of rotation extends substantially perpendicular to the first and/or second saddle conveying path. Optionally, the axis of rotation is arranged below at least a part of the saddle support guide and/or below at least a part of the first and/or second saddle conveyor.

In general, the leg separator will be arranged below the first saddle conveying path.

In a possible embodiment, the first saddle conveyor and the second saddle conveyor are spaced apart from each other such that an space is present between the downstream end of the first saddle conveyor and the upstream end of the second saddle conveyor. In this space, a carcass part is not conveyed by the first saddle conveyor nor by the second saddle conveyor. In this embodiment, the leg separator is arranged such that leg grippers engage the leg parts while the carcass part is in the space between the first and the second saddle conveyor. The leg grippers are moveable and adapted to bring the carcass part from the space between the first and second saddle conveyor into engagement with the second saddle conveyor by the movement they impose on the leg parts.

In a corresponding embodiment of the method according to the invention, the method comprises a step wherein leg grippers engage the leg parts while the carcass part is in the space between the first and the second saddle conveyor, and wherein the leg grippers move the carcass part to bring the saddle into engagement with the second saddle conveyor by the movement they impose on the leg parts.

With this arrangement, it is ensured that the leg parts are gripped firmly by the leg grippers. Because the leg grippers have to move the carcass part against the friction of the saddle on the support guide and the inertia of the carcass part, the leg part will generally come to lie in the back part of the leg gripping slot. This ensures a firm grip on the leg parts, leading to a reliable operation of the device according to the invention.

Furthermore, it makes the timing between the first conveyor and the leg grippers less critical. Without the space between the first and second conveyor, the carcass parts would have to arrive at the leg separator within a rather narrow time slot in order for the leg parts to be engaged by the leg grippers. If the carcass parts would arrive a little too early or a little too late at the point where the leg grippers engage the leg parts, the leg grippers would miss the leg parts and the legs would not be separated form the saddle. With the space between the first and second conveyor, the carcass part waits in the space until a leg gripper comes by to engage the legs.

In a possible embodiment, the second saddle conveyor is adapted to convey the saddle at a different speed than the speed at which the leg grippers move the leg parts. Optionally, the method according to the invention comprises a step wherein the second saddle conveyor conveys the saddle at a different speed than the speed at which the leg grippers move the leg parts.

In a possible embodiment, the leg grippers are adapted to move the leg parts along a leg gripper path, which leg gripper path diverges from the second saddle conveying path. Optionally, the method according to the invention comprises a step wherein the leg grippers move the leg parts along a leg gripper path, which leg gripper path diverges from the second saddle conveying path.

In a possible embodiment, one or more cuts are made in the carcass part in order to ensure an accurate separation of the leg parts from the saddle due to the pulling.

To this end, the device according to the invention optionally includes a groin cutter which is adapted to make an incision between each leg part and the saddle in the groin region of the carcass part, and/or a back cutter, which back cutter is adapted for making an incision between each leg part and the saddle in the back region of the carcass part. The back cutter is arranged such that after making the back incision, a tissue connection remains between the each leg part and the saddle part. Optionally, the groin cut is carried out prior to the dislocation of the hip joints. Optionally, the back cut is carried out after the dislocation of the hip joints.

Optionally, the method according to the invention comprises at least one of the steps:
making an incision between each leg part and the saddle in the groin region of the carcass part using a groin cutter, and/or
making an incision between each leg part and the saddle in the back region of the carcass part using a back cutter in such a way that after making the back incision, a tissue connection remains between each leg part and the saddle.

In a possible embodiment, a support conveyor is present to support the saddle when the incisions in the groin are made and/or when the incisions in the back are made. Optionally, the support conveyor supports the carcass part along a path. Along this path, the support conveyor moves at a conveying speed, which conveying speed is at least initially substantially the same as the speed of the carriers of the main conveyor above the support conveyor, and the path is at least initially parallel to the path of the carriers of the main conveyor.

In a possible embodiment, the first saddle conveying path and the second saddle conveying path extend under an angle relative to each other. In such an embodiment, optionally the saddle of the carcass part is slowed down as it passes through the angle between the first and the second saddle conveyor. This can help to create a difference in the speed between the saddle and the leg parts, therewith creating the downward pulling of the leg parts that separates the leg parts from the saddle. Optionally, in this embodiment, the leg grippers move the leg parts while the saddle passes through the angle between the first and the second saddle conveyor, and the leg grippers maintain the same speed or increase the speed they impose on the leg parts while the saddle passes through the angle between the first and the second saddle conveyor.

In an advantageous embodiment, the device according to the invention comprises at least this combination of optional features:
  a first saddle conveyor, which first saddle conveyor is arranged below the carriers of the main conveyor, which first saddle conveyor is arranged and adapted to engage the saddle of the carcass part and to convey the carcass part along a first saddle conveying path at a conveying speed,
  a groin cutter which is adapted to make an incision between each leg part and the saddle in the groin region of the carcass part,
  in the hip dislocator assembly, a hip dislocating guide, which hip dislocating guide is arranged below the main conveyor and above the support conveyor such that it engages carcass parts between the legs, said hip dislocating guide gradually extending outward and downward such that the leg parts are spread apart, thereby disengaging the leg parts from the carrier of the main conveyor and dislocating the hip joints such that the free ends of the leg parts come to point downward,
  a back cutter, which back cutter is adapted for making an incision between each leg part and the saddle in the back region of the carcass part, which back cutter is arranged such that after making the back incision, a tissue connection remains between the each leg part and the saddle part,
  a second saddle conveyor, which second saddle conveyor being adapted to receive the carcass part from the first saddle conveyor with the leg parts pointing downward, said second saddle conveyor being adapted to engage the carcass part by the saddle and to convey the saddle of the carcass part along a second saddle conveying path, wherein the leg separator is arranged below the first saddle conveying path, and wherein each leg gripper is adapted to grip a leg part while the saddle support guide supports the saddle and the leg parts are directed downwardly, and wherein the leg grippers and the second saddle conveyor together are adapted to induce the downward pulling movement of the leg parts relative to the saddle.

In an advantageous embodiment, the method according to the invention comprises at least this combination of optional steps:
while the carcass part is in a carrier of the main conveyor, engaging the saddle of the carcass part by a first saddle support conveyor, which first saddle support conveyor is arranged below the main conveyor, the first saddle conveyor conveying the carcass part along a first saddle conveying path at a conveying speed, which conveying speed is at least initially substantially the same as the speed of the carriers of the main conveyor and the first saddle path at least initially being parallel to the path of the carriers of the main conveyor,
making an incision between each leg part and the saddle in the groin region of the carcass part using a groin cutter,
in the step of dislocating the hip joints, disengaging the leg parts from the carrier of the main conveyor and dislocating the hip joints such that the free ends of the leg parts come to point downward by means of a hip dislocating guide that gradually extends outward and downward, meanwhile continuing to move the carcass part using the first saddle conveyor and supporting the carcass part by a saddle support guide that engages the saddle of the carcass part,
making an incision between each leg part and the saddle in the back region of the carcass part using a back cutter in such a way that after making the back incision, a tissue connection remains between the each leg part and the saddle part,
transferring the carcass part to a second saddle conveyor, which second saddle conveyor conveys the saddle along a second saddle conveying path with the leg parts directed downward, and the saddle support guide supporting the saddle during this conveying,
supporting the saddle by the saddle support guide during the step of gripping each leg part with a leg gripper,
inducing the downward pulling movement on the leg parts relative to the saddle by the leg grippers and the second saddle conveyor together.

BRIEF DESCRIPTION OF THE FIGURES

The invention will be described in more detail below under reference to the drawing, in which in a non-limiting manner exemplary embodiments of the invention will be shown.

The drawing shows in:
FIG. 3-FIG. 17: successive steps in an embodiment of the method according to the invention.

DETAILED DESCRIPTION

Figure 1:
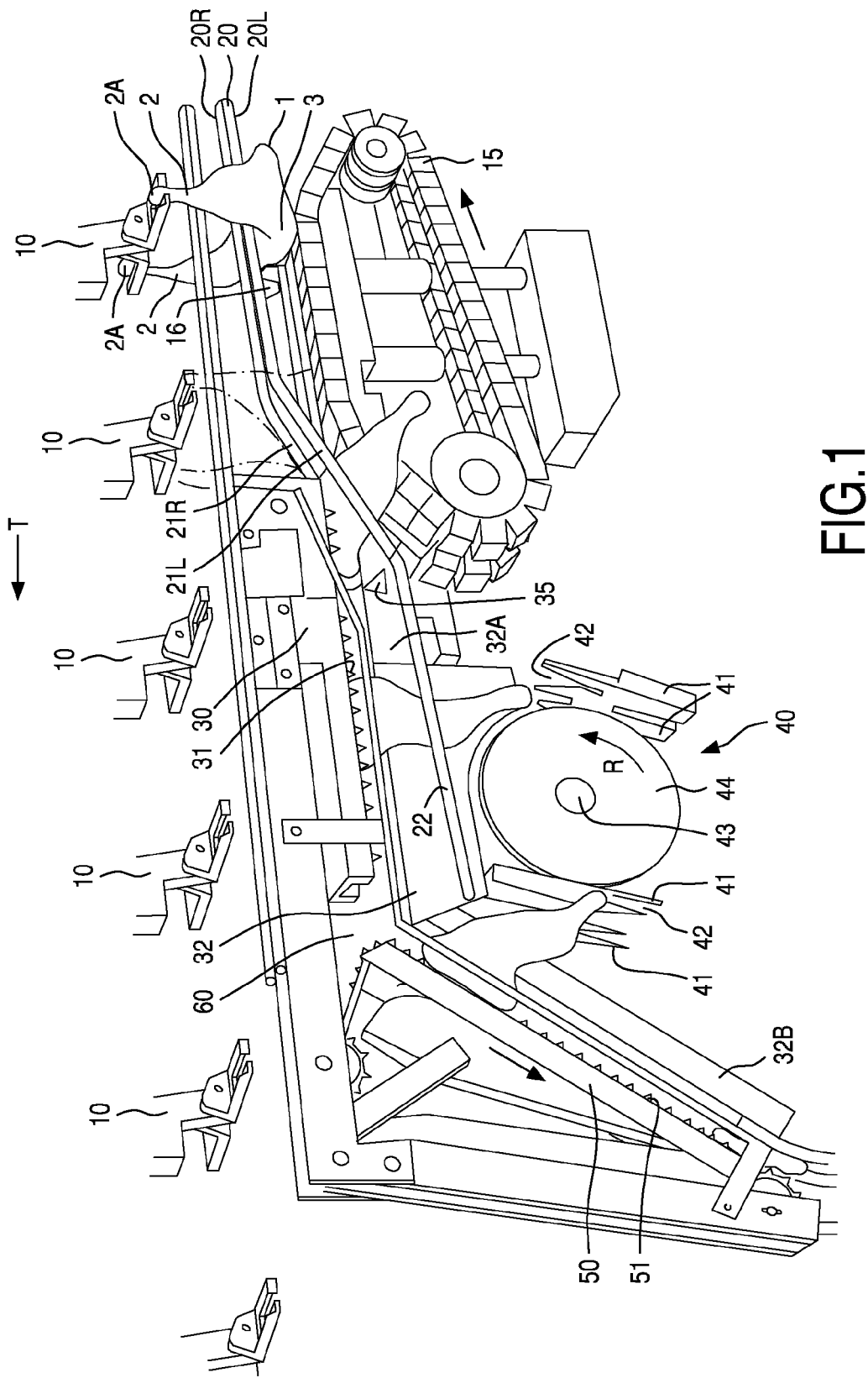
FIG. 1: a first embodiment of a device according to the invention.

FIG. 1 shows a first embodiment of a according to the invention.

A carcass part 1 is processed by the device according to the invention. The carcass part comprises leg parts 2 that comprise at least a part of the thigh. The carcass part further comprises a saddle 3 that is connected to each of the thighs via the hips. Each leg part comprises a free end 2A on the side opposite to the side where it is connected to the saddle.

The carcass part generally moves through the device according to the invention in the direction T as indicated in FIG. 1.

Initially, the carcass part is arranged in a carrier 10 of a main conveyor (not shown in more detail). A carrier 10 can for example be connected to a trolley over an overhead conveyor system. The trolleys of such a system are generally connected to each other by means of a drive chain or drive cable. The trolleys generally run over a track, e.g. a track with a cross-sectional shape in the form of a T or S.

The carcass part 1 is suspended from carrier 10. Carrier 10 engages the leg parts 2 of the carcass part 1, in the vicinity of the free ends 2A of the leg parts. Initially, as can be seen in FIG. 1, the free ends 2A of the leg parts 2 point upward.

A guide 20 extends along a large part of the device in this embodiment. Already when the carcass parts 1 initially move into the device, the guide 20 is arranged between the two leg parts 2 of the carcass part 1.

In the embodiment of FIG. 1, a support conveyor 15 is present. The support conveyor 15 supports the saddle 3 when the carcass part runs in the device and optionally also during the first steps of the method according to the invention.

The embodiment of the device according to the invention according to FIG. 1 also comprises a groin cutter 16 which is adapted to make an incision between each leg part and the saddle in the groin region of the carcass part. The groin cutter in the embodiment of FIG. 1 comprises two stationary blades, that in this embodiment are arranged on left part 20L and right part 20R of the guide 20. The support conveyor 15 supports the saddle 3 while the groin incision is being made.

In this embodiment, the support conveyor supports the carcass part along a path. Along this path, the support conveyor moves at a conveying speed, which conveying speed is at least initially substantially the same as the speed of the carriers of the main conveyor above the support conveyor, and the path is at least initially parallel to the path of the carriers of the main conveyor.

After the carcass part 1 has passed the groin cutter 16, the left part and the right part of the guide 20 gradually, as seen in the direction of transport T, come to lie further apart from each other. Also, they slope downward. This takes place in parts 21R and 21L of the guide 20. Due to this, the leg parts 2 are spread apart. As a first effect of this, the leg parts become disengaged from the carrier 10 of the main conveyor. If the carrier 10 has slots for engaging the carcass part that can be opened and closed, preferably the slots are opened before the carcass part reaches the widening parts 21R, 21L of the guide 20.

As a second effect, as the widening and sloping downward of the guide parts 21R and 21L continues, the hip joints become dislocated, the leg parts 2 tip over under the influence of gravity and the free ends 2A of the leg parts 2 come to point downward. The parts 21R and 21L of the guide 20 therewith act as hip dislocation guide.

In order to ensure that the transport of the carcass part 1 through the device according to FIG. 1 continues after the carcass part is no longer engaged by the carrier 10 of the main conveyor, a first saddle conveyor 30 is present. The first saddle conveyor 30 is arranged below the carriers 10 of the main conveyor and adapted to engage the saddle 3 of the carcass part 1. The first saddle conveyor conveys the carcass part further into the device according to the invention.

In the embodiment of FIG. 1, the upstream end of the first saddle conveyor 30 is arranged about halfway the widening part 21R, 21L of the guide 20. However, it is possible that the first saddle conveyor extends further towards the run-in part of the device, so it engages the saddle 3 in an earlier stage of the process, e.g. just after the groin incision is made.

The first saddle conveyor 30 in this embodiment comprises a toothed chain 31. The teeth are protrusions that grip the saddle 3 of the carcass part 1. As the chain 31 is driven by a drive (not shown) the chain 31 transports the carcass parts 1 further into the device according to the invention.

Beneath the first saddle conveyor 30, a saddle support guide 32 is arranged. The saddle support guide 32 supports the saddle 3 of the carcass part 1 while it is transported by the first saddle conveyor 30, and later during transport through the device according to the invention.

In the embodiment of FIG. 1, the saddle support guide 32 has two parts. The first part 32A extends horizontally, parallel to the lower flight of the chain 31 of the first saddle conveyor 30. The chain 31 of the first saddle conveyor 30 pushes the saddle 3 against the horizontal saddle support guide part 32A in order to obtain a firm grip.

The first saddle conveyor 30 and the horizontal saddle support guide part 32A together define the first saddle conveying path that is followed by the saddle 3 as it is transported through the device according to the invention by the first saddle conveyor 30.

To the vertical side walls of the horizontal saddle support guide part 32A, a back cutter 35 is arranged in the embodiment of FIG. 1. The back cutter 35 here comprises two stationary blades, one on the left side and one on the right side of the device. The back cutter 35 is adapted for making an incision between each leg part and the saddle in the back region of the carcass part. The blades of the back cutter 35 are arranged such that after making the back incision, a tissue connection remains between the each leg part and the saddle part. Instead of being mounted to the side walls of the saddle support guide, the blades of the back cutter can be mounted to other parts of the device, e.g. to a frame.

So far, the device according to the invention is similar to the device described in EPO459580.

The device further comprises a leg separator 40. The leg separator 40 is arranged below the first saddle conveying path, in this case below the first saddle conveyor 30 and the horizontal saddle support guide part 32A. In the embodiment of FIG. 1, it comprises four leg grippers 41. Each leg gripper comprises a leg gripping slot 42 for engaging a leg part 2. The leg separator 40 is arranged such that each leg gripper 41 is adapted to grip a leg part 2 while the saddle support guide 32 supports the saddle and the leg parts 2 are directed downward.

In the embodiment of FIG. 1, the leg grippers 41 are mounted as two pairs on a wheel 44 that is rotatable about an axis of rotation 43 in the direction of arrow R. A drive (not shown) drives the rotation of the wheel 44. Due to this construction, the leg grippers 41 are moveable along a circular path. The wheel 44 is mounted in a vertical plane. In this embodiment, the wheel comprises two pairs of leg grippers as this is advantageous with respect to timing, curvature of the path and speed of the wheel. While one pair of grippers engages legs parts, the other pair does not.

As the carcass part 1 approaches the wheel 44 with the leg parts 2 pointing downward, a pair of leg grippers 41 rotates upward towards the leg parts 2 of the carcass part 1. As the rotation of the wheel continues, each leg part 2 comes to lie in the leg gripping slot 42 of a leg gripper 41.

The continued rotation of the wheel 44 in the direction of arrow R pulls the leg parts downward.

In the meantime, the first saddle conveyor 30 has released the saddle 3 and a second saddle conveyor 50 has engaged the saddle 3. In the embodiment of FIG. 1, the second saddle conveyor 50 extends at an angle relative to the first saddle conveyor 30. The second saddle conveyor 50 extend downward relative to the first saddle conveyor 30.

In the embodiment of FIG. 1, the second saddle conveyor 50 comprises a chain 51 with protrusions that engage the saddle.

The saddle support guide 32 comprises a sloping part 32B that extends parallel to the lower flight of the chain 51 of the second saddle conveyor 50. The sloping saddle support guide 32B supports the saddle 3 of the carcass part 1 while it is transported by the second saddle conveyor 50. The chain 51 of the second saddle conveyor 50 pushes the saddle 3 against the sloping saddle support guide part 32B in order to obtain a firm grip.

The second saddle conveyor 50 and the sloping saddle support guide part 32B together define the second saddle conveying path that is followed by the saddle 3 as it is transported further through the device according to the invention by the second saddle conveyor 50.

The leg grippers 41 and the second saddle conveyor 50 are adapted to together induce a downward pulling movement of the leg parts 2 relative to the saddle 3, thereby tearing loose the tissue connection between each leg part 2 and the saddle 3 that remained after the incisions by the back cutter. This causes the leg parts 2 to become separated from the saddle 3.

As is clear from FIG. 1, the second saddle conveying path and the path of the leg grippers 41 diverge as the leg grippers 41 rotate through the lower part of their circular path. This causes a pulling force on the leg parts 2 that has a downward component.

The downward pulling force is increased by making the second saddle conveyor 50 transport the saddle 3 at a lower speed than the leg grippers 41 rotate. This way, the speed of the saddle 3 is lower than the speed of the leg parts 2, and an additional pulling force is obtained.

As can be seen in FIG. 1, the first saddle conveyor 30 and the second saddle conveyor 50 are spaced apart from each other such that a space 60 is present between the downstream end of the first saddle conveyor 30 and the upstream end of the second saddle conveyor 50. In this space 60, the carcass part 1 is not conveyed by the first saddle conveyor 30 nor by the second saddle conveyor 50. The leg separator 40 is arranged such that leg grippers 41 engage the leg parts 2 while the carcass part 1 is in the space 60 between the first and the second saddle conveyor. The leg grippers 41 are move along their circular paths and take the carcass part 1 with them, sliding the saddle 3 over the saddle support guide 32 below the space 60. By doing so, the leg grippers 41 bring the saddle 3 of the carcass part into engagement with the second saddle conveyor 50.

Advantageously, the saddle of the carcass part is slowed down as it passes through the angle between the first and the second saddle conveyor. This for example already occurs when the speed of the second saddle conveyor is lower than the speed of the leg grippers. In this case, this adds to the downward pulling force on the leg parts.

After separation of the leg parts 2 from the saddle 3, the leg parts 2 and the saddle 3 are discharged from the device according to the invention, e.g. on a belt conveyor or in a container.

Figure 2:
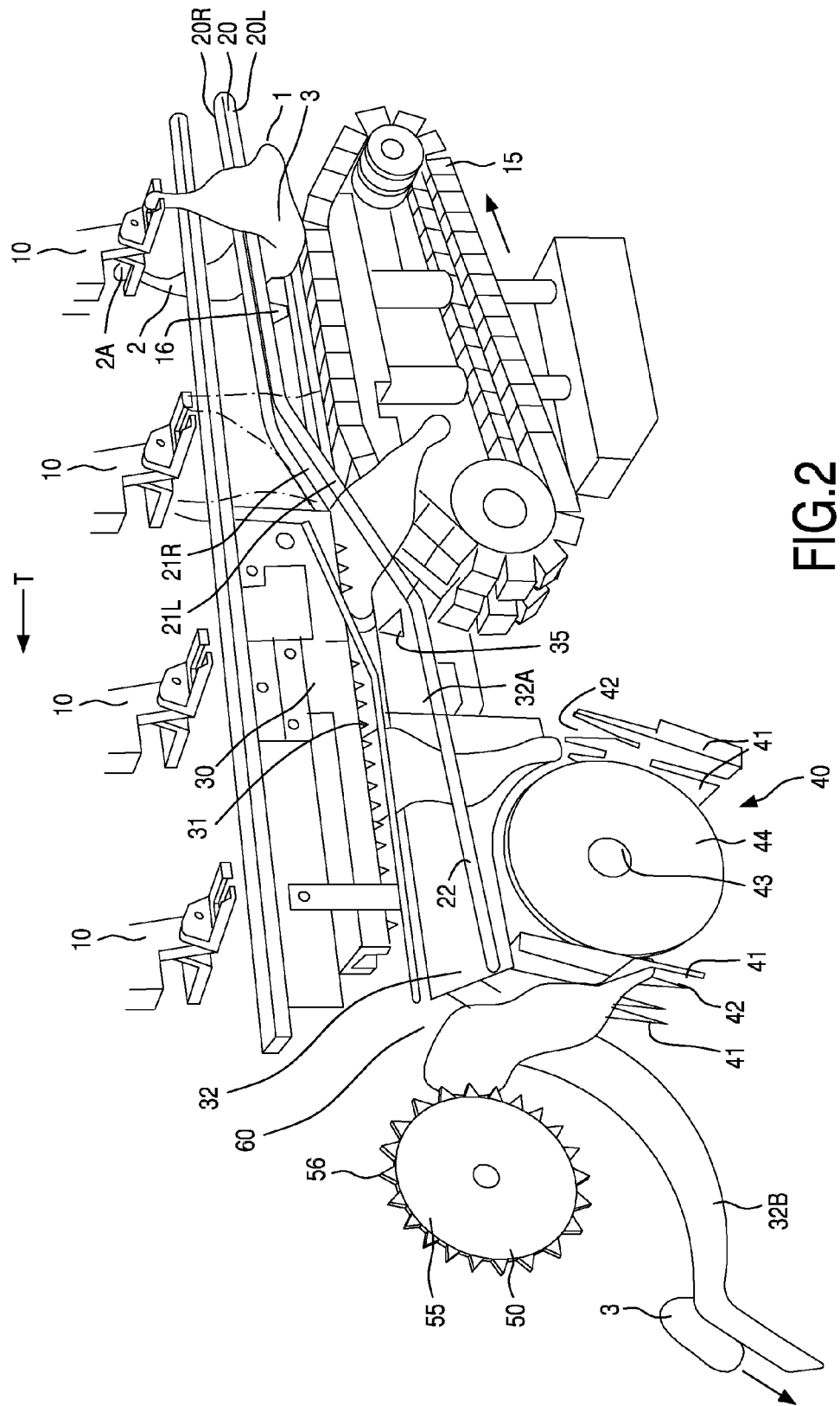
FIG. 2: a second embodiment of a device according to the invention.

FIG. 2 shows a second embodiment of the device according to the invention. The second embodiment of FIG. 2 is the same as the embodiment of FIG. 1, except for the second saddle conveyor 50 and the sloping part of the saddle support guide 32B.

In the embodiment of FIG. 2, the second saddle conveyor 50 comprises a wheel 55 instead of chain 51. The wheel 56 is provides with protrusions, or teeth, 56, for engaging the saddle 3 and transporting it along the sloping part of the saddle support guide 32B.

In the embodiment of FIG. 2, the second saddle conveying path and the path of the leg grippers diverge more than in the embodiment of FIG. 1 and in a different way.

With the embodiment of FIG. 2, the harvesting of the oyster meat is even more reliable than with the embodiment of FIG. 1.

FIGS. 3-17 show subsequent steps of an embodiment of the method according to the invention.

Figure 3:
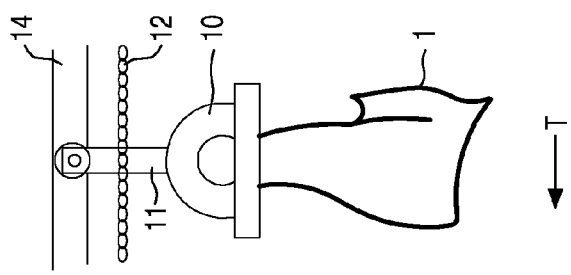

FIG. 3 shows in side view a carcass part 1, in this case a back half, that is suspended from a carrier 10 of the main conveyor. The carrier 10 is connected to a trolley 11 that runs over a track 14. Drive chain 12 connects the trolleys 11 of the main conveyor and drives them so that they move along the track 14 in direction of transport 2.

Figure 4:
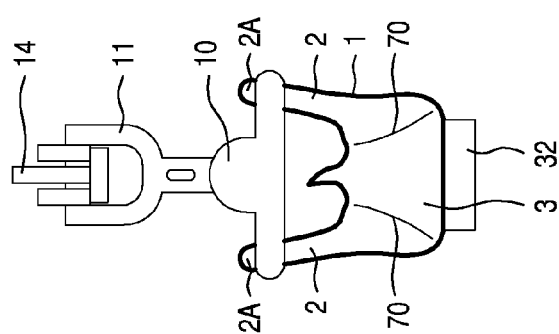

FIG. 4 shows a subsequent step in this embodiment of the method, in front view. The carcass part 1 is still suspended from the carrier 10 of the main conveyor by the leg parts 2. The saddle now rests on saddle support 32. Alternatively, the saddle 3 could in this stage be supported by support conveyor 15.

As FIG. 4 is a front view, we are looking at the belly side of the carcass part 1. Two groin incisions 70 are made in this step, extending between the saddle 3 and each of the leg parts 2.

Figure 5:
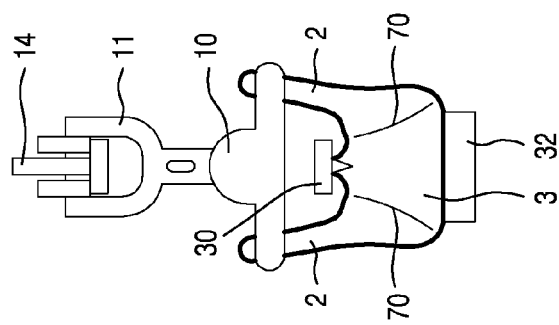

FIG. 5 shows a subsequent step in this embodiment of the method, in front view. The carcass part 1 is still suspended from the carrier 10 of the main conveyor by the leg parts 2. The saddle now rests on saddle support 32. Alternatively, the saddle 3 could in this stage be supported by support conveyor 15.

As FIG. 5 is a front view, we are looking at the belly side of the carcass part. In the step of FIG. 5, the first saddle conveyor 30 has come into contact with the saddle 3, transporting it further into the device according to the invention. The speed and direction of transport of the carrier 10 of the main conveyor and the first saddle conveyor 30 are the same.

Figure 6:
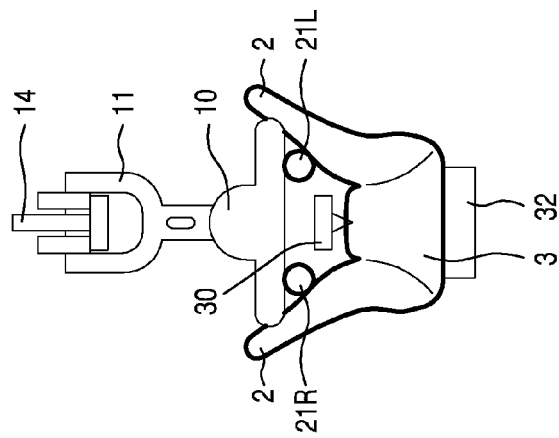

FIG. 6 shows a subsequent step in this embodiment of the method, in front view. The saddle still rests on saddle support 32 and is transported by the first saddle conveyor 30. As FIG. 6 is a front view, we are looking at the belly side of the carcass part.

In the step of FIG. 6, the hip dislocating guide 21L,21R has come into engagement with the leg parts 2. The hip dislocating guide 21L, 21R spreads the leg parts 2 apart. This causes the carrier 10 of the main conveyor to let go of the leg parts 2. The first saddle conveyor 30 now fully takes over the transport of the carcass parts 1.

FIG. 7 shows a subsequent step in this embodiment of the method, in front view. The saddle still rests on saddle support 32 and is transported by the first saddle conveyor 30. As FIG. 7 is a front view, we are looking at the belly side of the carcass part.

In the step of FIG. 7, the hip dislocating guide 21L,21R still is in engagement with the leg parts 2. The hip dislocating guide 21L, 21R spreads the leg parts 2 further apart, causing dislocation of the hip joints.

FIG. 8 shows a subsequent step in this embodiment of the method, in front view. The saddle still rests on saddle support 32 and is transported by the first saddle conveyor 30. As FIG. 8 is a front view, we are looking at the belly side of the carcass part.

In the step of FIG. 8, the hip joints have been dislocated and the leg parts have flipped over from a position in which the free ends are pointing upward (FIGS. 3-6) to a position in which the leg parts are pointing downward, as is seen in FIG. 8.

The hip dislocating guide 21L,21R still is in engagement with the leg parts 2 for increased position control of the leg parts 2. This is an optional feature, it is not necessary that the hip dislocating guide is still in engagement with the leg parts 2 in this stage of the process.

FIG. 9 shows a subsequent step in this embodiment of the method, in front view. The saddle still rests on saddle support 32 and is transported by the first saddle conveyor 30. As FIG. 9 is a front view, we are looking at the belly side of the carcass part.

In this step, back cutters 35 are making incisions between the leg parts and the saddle in the back region of the carcass part. A tissue connection between the saddle and the leg parts remains.

In this step the path of the carrier of the main conveyor may have diverged from the path of the carcass parts through the device, so it is no longer above the carcass part. This is an optional step. The guide 20 no longer functions as hip dislocation guide. Guide parts 22 provide additional position control for the leg parts.

FIG. 10 shows the situation just after the situation of FIG. 9 in side view.

FIG. 11 shows a subsequent step in this embodiment of the method, in side view. The carcass part 1 is now approaching the downstream end of the first saddle conveyor 30, and therewith the space 60 between the first and the second conveyor.

The chain 31 with the protrusions 33 engages the saddle 3 and slides it towards the space 60 over the horizontal part 32B of the saddle support guide 32. Guide 22 provides additional position control of the leg parts 2.

The carcass part now also approaches leg separator 40. Leg separator 40 comprises wheel 44 that rotates about axis of rotation 43 in the direction of arrow R. Leg grippers 41 are mounted onto the wheel 44 and rotate with it. The leg grippers 41 are positioned as two pairs, each pair being adapted to grip two leg parts of the same carcass part. As FIG. 11 is a side view, only one leg gripper per pair is shown.

Figure 12:
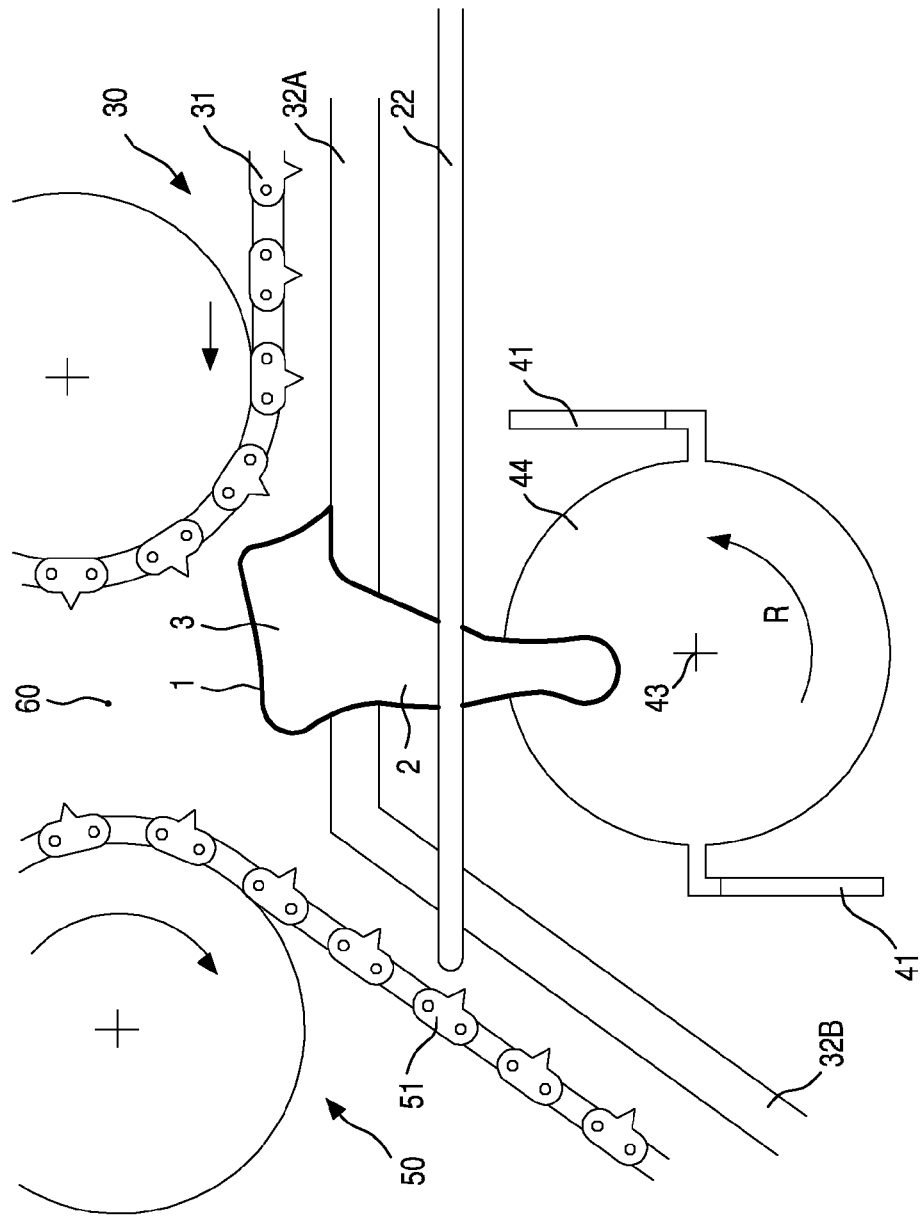

FIG. 12 shows a subsequent step in this embodiment of the method, in side view. The carcass part 1 has reached the space 60 in which it is no longer driven by the first saddle conveyor 30 and not yet driven by the second saddle conveyor 50. The carcass part is now waiting for a leg gripper 41 to come to grip it by the leg parts 2.

Figure 13:
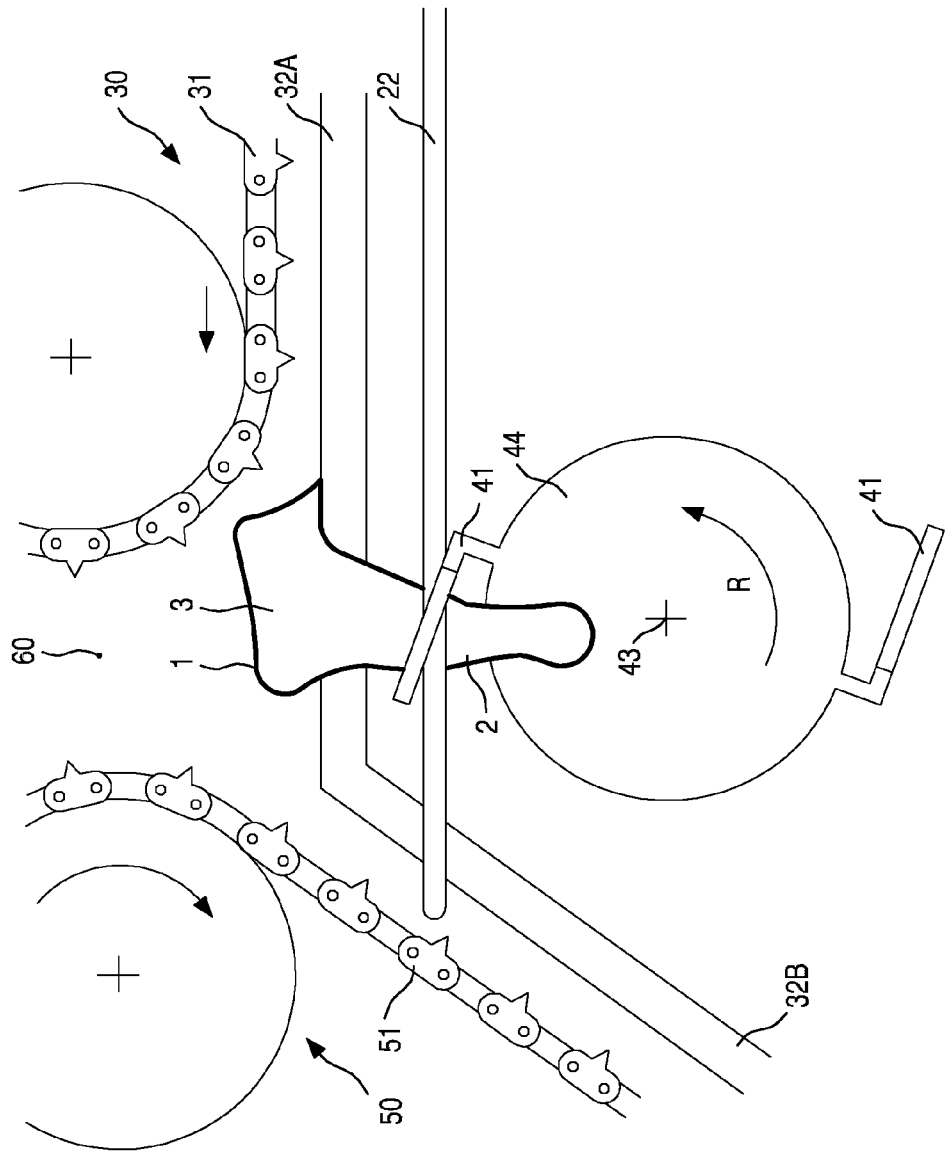

FIG. 13 shows a subsequent step in this embodiment of the method, in side view. The wheel 44 of the leg separator has rotated further in the direction of arrow R. The top leg gripper 41 pair has engaged the leg parts 2 of the carcass part. Each leg part 2 is now arranged in and held by a leg gripping slot of a leg gripper 41.

Figure 14:
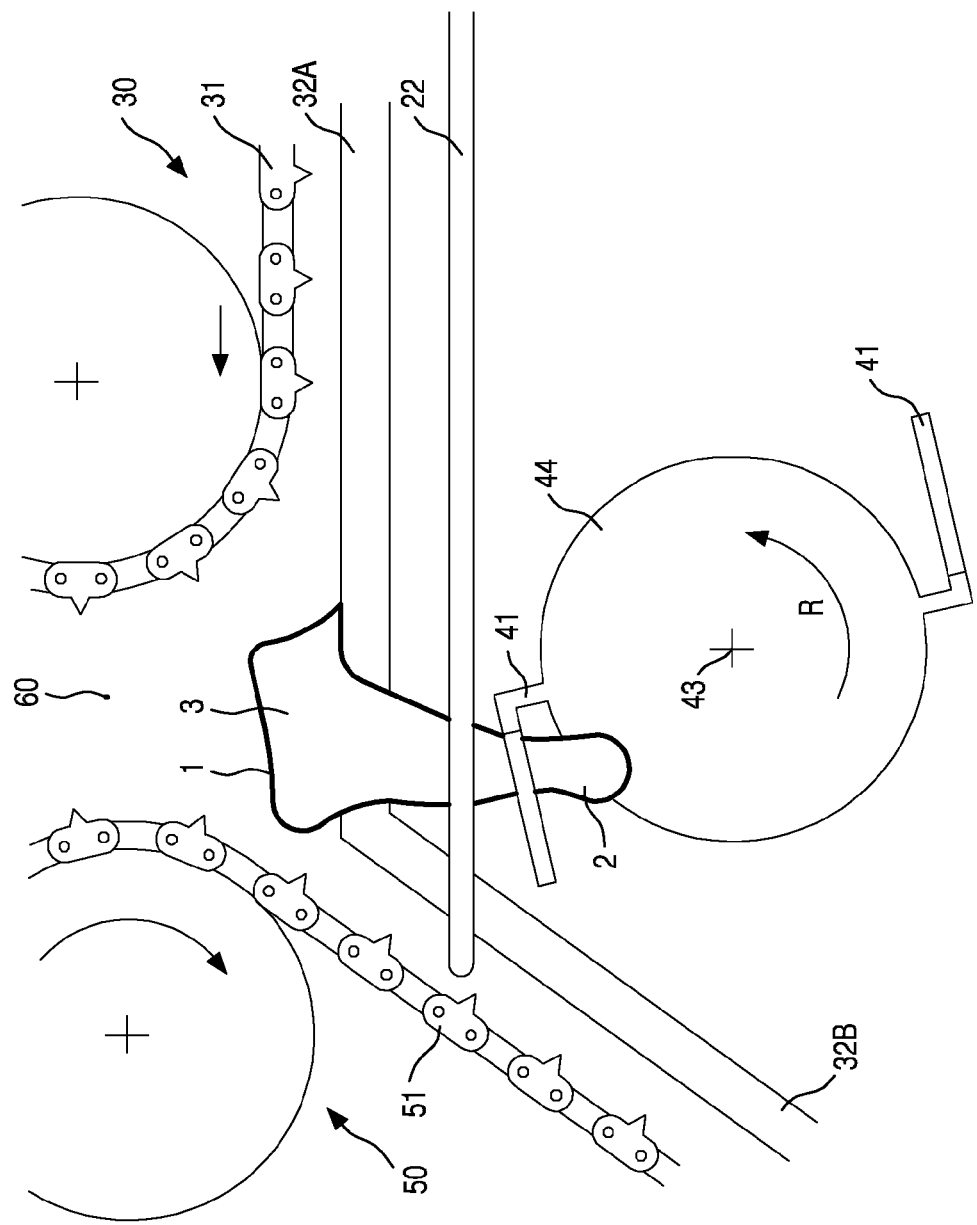

FIG. 14 shows a subsequent step in this embodiment of the method, in side view. The wheel 44 of the leg separator has rotated further in the direction of arrow R. The leg grippers 41 that have engaged the leg parts 2 drag the carcass part 1 through the space 60 to the second saddle conveyor 50.

Figure 15:
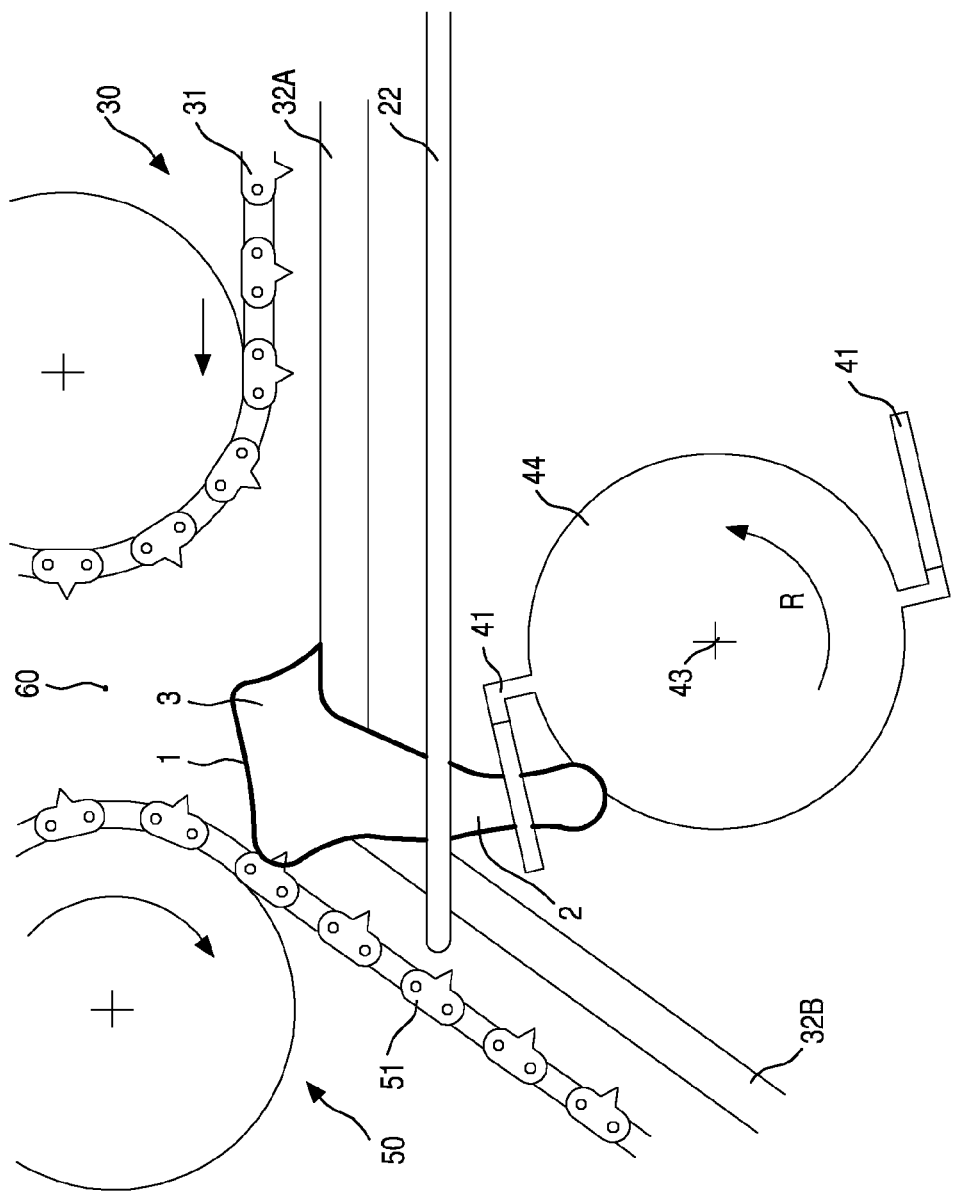

FIG. 15 shows a subsequent step this embodiment of in the method, in side view. The wheel 44 of the leg separator has rotated further in the direction of arrow R. The saddle 3 of the carcass part 1 is now brought into engagement with the second saddle conveyor 50.

The second saddle conveyor advantageously runs at a speed that is lower than the speed of the leg grippers. Therewith, the saddle 3 is slowed down here, but the leg parts 2 are not. This creates tension on the tissue that remained between the leg parts and the saddle, maybe even tearing it somewhat already.

Figure 16:
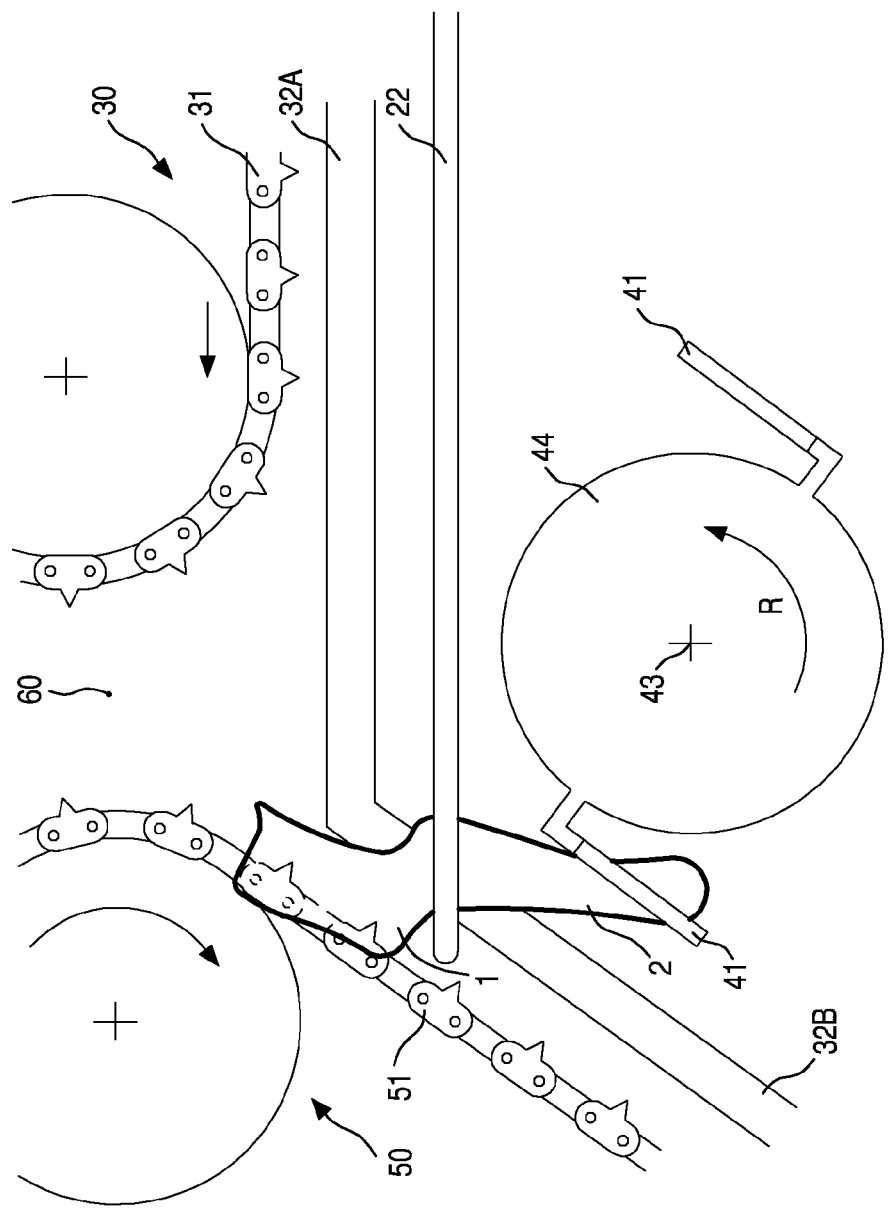

FIG. 16 shows a subsequent step in this embodiment of the method, in side view. The wheel 44 of the leg separator has rotated further in the direction of arrow R. The saddle 3 of the carcass part 1 is conveyed by the second saddle conveyor 50.

The second saddle conveyor advantageously runs at a speed that is lower than the speed of the leg grippers. In that case, further tension is created on the tissue that remained between the leg parts and the saddle. Generally, tearing of the tissue between the leg parts 2 and the saddle 3 already starts at this stage.

Figure 17:
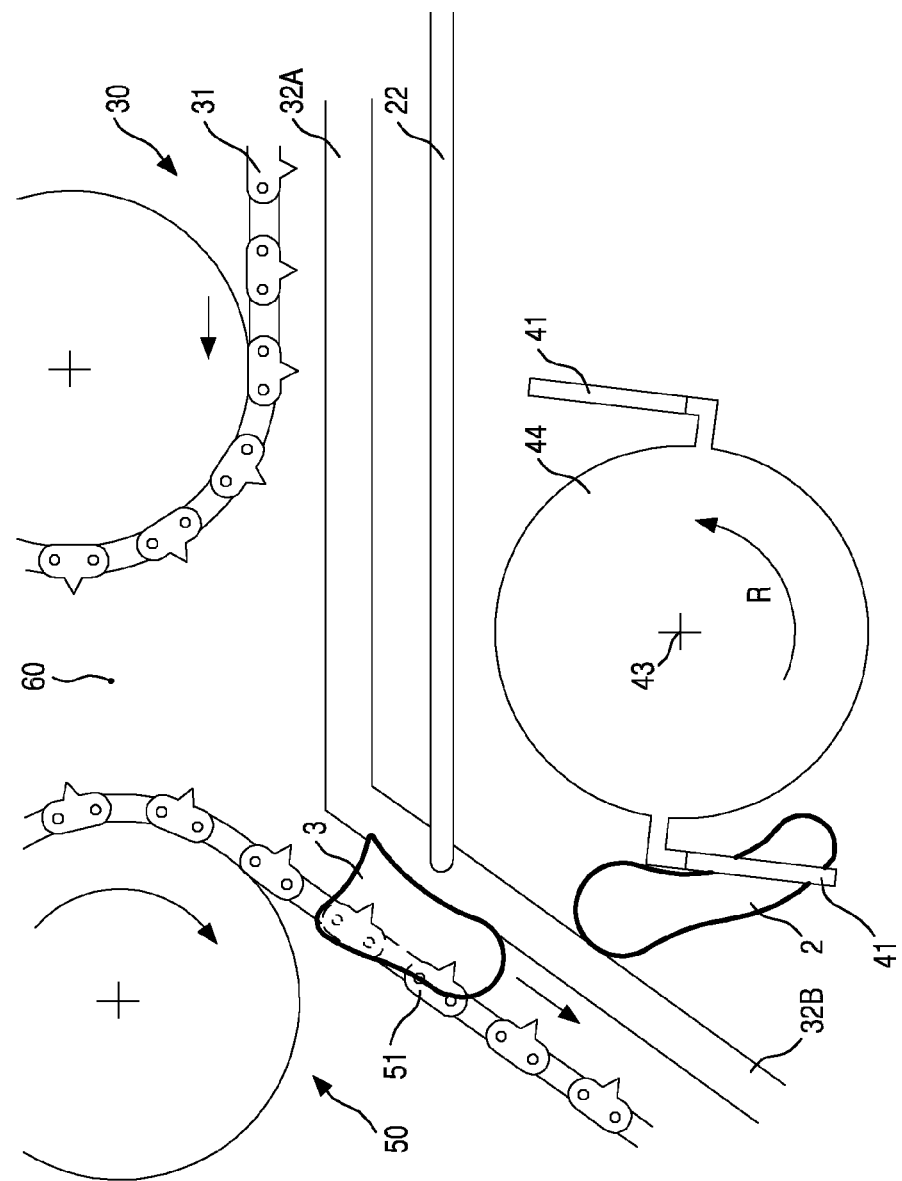

FIG. 17 shows the last step of this embodiment of the method, in side view. The wheel 44 of the leg separator has rotated further in the direction of arrow R. The leg parts 2 have now become separated from the saddle 3.

The figures show rather elaborate embodiments of the device and method according to the invention. Simpler embodiments are possible as alternatives. For example, an embodiment is possible in which after the hip joints are dislocated and the leg parts have been disengaged from the carrier of the main conveyor, the saddle is held in a fixed position instead of being conveyed by a first and/or second conveyor. The leg grippers of the leg separator engage the leg parts while the saddle is in this fixed position. During the downward pulling of the leg parts, the saddle also maintains its fixed position. After separation of the leg parts, the saddle is discharged from the device.

The invention claimed is:

1. Device for separating at least one leg part from a carcass part of slaughtered poultry, which carcass part comprises leg parts that comprise at least a part of the thigh, the carcass part further comprising a saddle that is connected to each of the thighs via the hips, each leg part comprising a free end on the side opposite to the side where it is connected to the saddle, wherein the device comprises:
a main conveyor, which main conveyor comprises a plurality of carriers, each carrier being adapted to engage a carcass part by or in the vicinity of the free ends of the leg parts in such a way that the carcass part is suspended from the carrier with the free ends of the leg parts pointing upward, the main conveyor being provided with a drive for moving the carriers along a path,
a hip dislocator assembly, which is adapted to dislocate the hip joints in such a way that after said dislocation, a tissue connection remains between each leg part and the saddle, and adapted to disengage the leg parts from the carrier of the main conveyor such that the free ends of the leg parts come to point downward,
a saddle support guide, which is adapted for supporting the saddle of the carcass part after the carcass part has become disengaged from the carrier of the main conveyor,
a leg separator comprising two leg grippers, each leg gripper comprising a leg gripping slot that is adapted for engaging a leg part, wherein the leg grippers are adapted to induce a downward pulling movement of the leg parts relative to the saddle, thereby tearing loose the tissue connection between each leg part and the saddle such that the leg parts are separated from the saddle, the leg separator being arranged relative to the saddle support guide such that the saddle support guide supports the saddle during the gripping and pulling of the leg parts.

2. Device according to claim 1, wherein the device further comprises a saddle conveyor adapted to engage the carcass part by the saddle and to convey the saddle of the carcass part along a saddle conveying path and wherein the leg grippers and the saddle conveyor together are adapted to induce the downward pulling movement of the leg parts relative to the saddle.

3. Device according to claim 2, wherein the saddle conveyor is adapted to convey the saddle at a different speed than the speed at which the leg grippers move the leg parts.

4. Device according to claim 2, wherein the leg grippers are adapted to move the leg parts along a leg gripper path, which leg gripper path diverges from the saddle conveying path.

5. Device according to claim 2, wherein the saddle conveyor comprises a wheel.

6. Device according to claim 5, wherein the wheel comprises protrusions for engaging the saddle.

7. Device according to claim 1, wherein the device further comprises a saddle conveyor arranged below the carriers of the main conveyor and arranged and adapted to engage the saddle of the carcass part and to convey the carcass part along a first saddle conveying path at a conveying speed.

8. Device according to claim 1, wherein the device further comprises:
a first saddle conveyor arranged below the carriers of the main conveyor and arranged and adapted to engage the saddle of the carcass part and to convey the carcass part along a first saddle conveying path at a conveying speed; and
a second saddle conveyor adapted to engage the carcass part by the saddle and to convey the saddle of the carcass part along a second saddle conveying path,
wherein the leg grippers and the second saddle conveyor together are adapted to induce the downward pulling movement of the leg parts relative to the saddle and wherein the second saddle conveyor is adapted to receive the carcass part from the first saddle conveyor.

9. Device according to claim 8, wherein the second saddle conveyor is adapted to receive the carcass part from the first saddle conveyor with the leg parts of the carcass part pointing downward.

10. Device according to claim 8, wherein the first saddle conveying path and the second saddle conveying path extend at an angle relative to each other.

11. Device according to claim 10, wherein the second saddle conveying path extends downward relative to the first saddle conveying path.

12. Device according to claim 8, wherein the first saddle conveyor and the second saddle conveyor are spaced apart from each other such that an space is present between a downstream end of the first saddle conveyor and an upstream end of the second saddle conveyor, in which space a carcass part is not conveyed by the first saddle conveyor nor by the second saddle conveyor, wherein the leg separator is arranged such that leg grippers engage the leg parts while the carcass part is in the space between the first and the second saddle conveyor, and wherein the leg grippers are moveable and adapted to bring the carcass part from said space between the first and second saddle conveyor into engagement with the second saddle conveyor by the movement the leg grippers impose on the leg parts.

13. Device according to claim 8, wherein the leg grippers are mounted such that they are rotatable about an axis of rotation and wherein the axis of rotation extends substantially perpendicular to at least one of the first and the second saddle conveying paths.

14. Device according to claim 8, wherein the leg grippers are mounted such that they are rotatable about an axis of rotation and wherein the axis of rotation is arranged below at least a part of at least one of the first and the second saddle conveyors.

15. Device according to claim 1, wherein the leg grippers are movable along a circular path in an at least substantial vertical plane and are adapted to engage the leg part at or near the highest point of the circular path and to effect the pulling movement during the movement towards the lowest point of the circular path.

16. Device according to claim 1, wherein the leg grippers are mounted such that they are rotatable about an axis of rotation.

17. Device according to claim 16, wherein at least one leg gripper is mounted on a wheel that is rotatable around said axis of rotation.

18. Device according to claim 16, wherein the axis of rotation is arranged below at least a part of the saddle support guide.

19. Method for separating at least one leg part from a carcass part of slaughtered poultry, which carcass part comprises leg parts that comprise at least a part of the thigh, the carcass part further comprising a saddle that is connected to each of the thighs via the hips, each leg part comprising a free end on the side opposite to the side where it is connected to the saddle, wherein the method comprises:
  conveying the carcass parts along a path in a main conveyor, which main conveyor comprises a plurality of carriers, a carrier engaging a carcass part by the free ends of the leg parts in such a way that the carcass part is suspended from the carrier with the free ends of the leg parts pointing upward,
  dislocating the hip joints such that a tissue connection remains between each leg part and the saddle,
  disengaging the leg parts from the carrier of the main conveyor, thereby making the free ends of the leg parts point downward,
  after disengaging the leg parts from the carrier of the main conveyor, supporting the saddle,
  gripping each leg part using a leg separator with a leg gripper, each leg gripper having a leg gripping slot for engaging a leg part,
  separating the leg parts from the saddle by exerting a downward pulling movement on the leg parts relative to the saddle, thereby tearing loose the tissue connection between each leg part and the saddle such that the leg parts become separated from the saddle.

20. Method according to claim 19, wherein dislocating the hip joints comprises moving the carcass part relative to a hip dislocating guide that is arranged below the main conveyor and between the leg parts and that gradually extends outwardly and downwardly such that the leg parts become disengaged from the carrier of the main conveyor and the hip joints become dislocated, wherein after the dislocation of the hip joints the free ends of the leg parts are pointing downward.

21. Method according to claim 19, wherein, after the leg parts have become disengaged from the carrier of the main conveyor, the carcass part is supported by a saddle support guide, and wherein said saddle support guide supports the saddle when the leg parts are gripped by the leg grippers of the leg separator and are subjected by the downward pulling movement.

22. Method according to claim 19, wherein a saddle conveyor conveys the saddle along a saddle conveying path, and wherein the leg grippers and the saddle conveyor together induce the downward pulling movement on the leg parts relative to the saddle.

23. Method according to claim 22, wherein the saddle conveyor conveys the saddle at a different speed than the speed at which the leg grippers move the leg parts.

24. Method according to claim 22, wherein the leg grippers move the leg parts along a leg gripper path, which leg gripper path diverges from the saddle conveying path.

25. Method according to claim 19, wherein a saddle conveyor is arranged below the carriers of the main conveyor, which saddle conveyor engages the saddle of the carcass part and conveys the carcass part along a saddle conveying path at a conveying speed.

26. Method according to claim 19, wherein a first saddle conveyor is arranged below the carriers of the main conveyor, which first saddle conveyor engages the saddle of the carcass part and conveys the carcass part along a first saddle conveying path at a conveying speed, wherein a second saddle conveyor conveys the saddle along a second saddle conveying path, wherein the leg grippers and the second saddle conveyor together induce the downward pulling movement on the leg parts relative to the saddle, and wherein the first saddle conveyor is positioned upstream of the second saddle conveyor.

27. Method according to claim 26, wherein the carcass part is transferred from the first saddle conveyor to the second saddle conveyor.

28. Method according to claim 27, wherein the first saddle conveying path and the second saddle conveying path extend at an angle relative to each other and wherein the saddle of the carcass part is slowed down as it passes through the angle between the first and the second saddle conveyor.

29. Method according to claim 28, wherein the second saddle conveying path extends downward relative to the first saddle conveying path.

30. Method according to claim 28, wherein the leg grippers move the leg parts while the saddle passes through the angle between the first and the second saddle conveyor paths, and the leg grippers maintain the same speed or increase the speed they impose on the leg parts while the saddle passes through the angle between the first and the second saddle conveyor paths.

31. Method according to claim 26, wherein the first saddle conveyor and the second saddle conveyor are spaced apart from each other such that an space is present between them in which a carcass part is not conveyed by the first saddle conveyor nor by the second saddle conveyor, and leg grippers engage the leg parts while the carcass part is in the space between the first and the second saddle conveyor, and the leg grippers move the carcass part to bring the saddle into engagement with the second saddle conveyor by the movement they impose on the leg parts.

32. Method according to claim 19, wherein the leg grippers are moved along a circular path in an at least substantial vertical plane, and wherein the leg grippers engage the leg part at or near the highest point of the circular path and effect the pulling movement during the movement towards the lowest point of the circular path.

33. Method according to claim 32, wherein the leg grippers rotate about an axis of rotation.

34. Method according to claim 33, wherein at least one leg gripper is mounted on a wheel that rotates around said axis of rotation.

* * * * *